United States Patent
Doskocil

(10) Patent No.: US 6,435,432 B1
(45) Date of Patent: Aug. 20, 2002

(54) BRUSH CHIPPER WITH A SLIDABLE FEED ROLLER

(76) Inventor: David Lee Doskocil, 1324 W. Rialto Ave., San Bernadino, CA (US) 92410

( * ) Notice: Subject to any disclaimer, the term of this patent is extended or adjusted under 35 U.S.C. 154(b) by 0 days.

(21) Appl. No.: 09/635,725

(22) Filed: Aug. 9, 2000

(51) Int. Cl.⁷ .............................................. B02C 19/00
(52) U.S. Cl. ....................... 241/92; 241/285.2; 241/294
(58) Field of Search ........................... 241/285.2, 285.3, 241/92, 294, 197

(56) References Cited

U.S. PATENT DOCUMENTS

| | | | | |
|---|---|---|---|---|
| 3,642,214 A | * | 2/1972 | Blackwell, Jr. | 241/191 |
| 3,813,045 A | * | 5/1974 | Greiffenstern | 241/285.1 |
| 4,938,425 A | * | 7/1990 | Williams et al. | 241/285.2 |
| 5,116,422 A | * | 5/1992 | Tilby | 241/285.2 |
| 6,176,445 B1 | * | 1/2001 | Shinn | 241/294 |

* cited by examiner

Primary Examiner—Mark Rosenbaum
(74) Attorney, Agent, or Firm—Lyon & Lyon LLP

(57) ABSTRACT

A brush chipper that enables easy and ready access to frequently maintained areas of the chipper comprises a chipper-knife assembly, a feed-roller assembly, and a sliding apparatus that allows the feed-roller assembly to move away from the chipper-knife assembly. This sliding apparatus, preferably, includes at least one track and at least one friction-reducing apparatus. The brush chipper preferably includes a chipper-knife assembly that comprises a knife with at least one threaded opening for attaching the knife to a support. To attach the knife to the support, a bolt threads through the support to secure the knife. The bolt includes a head and a stem, and the support is positioned between the knife and the head of the bolt.

16 Claims, 7 Drawing Sheets

BRUSH CHIPPER WITH A SLIDABLE FEED ROLLER

FIELD OF THE INVENTION

The present invention relates to the field of general maintenance.

BACKGROUND OF THE INVENTION

Many industrial, commercial, and household applications require the breaking up of relatively large objects into smaller pieces. This reduction process is variously referred to as cutting, chipping, shredding, mulching, or grinding, depending in part on the size of the end product. Cutting and chipping are historically accomplished by chippers using relatively few chipper knives mounted directly onto a rotating disc and a bed knife. The chippers can produce pieces ranging up to about ¾ to 1½ inches in size.

One of the major issues with respect to the design of such devices is maintenance. Maintenance and adjustment of chipper and bed knives can be extremely cumbersome. In many chippers, a team of two men is required to change the chipper knives, by working through holes in the side of the chipper body. Long feeler gauges must be used to adjust the gap between the chipper knives and the bed knives.

Another issue is the design and maintenance of the feed rollers. Traditionally, dirt and trash are carried into the chipper with the in-feeding of the brush and wood. The dirt usually falls into the lower feed roller. If not cleaned out, the dirt will lock up the feed roller such that it cannot rotate. In addition, the chipper knives are mounted to the rotating disc, usually, using ½ inch size Allen bolts with flat head sockets and a nut. The holes for the Allen bolts are exposed to the feed material and are easily plugged with debris. The debris strips out the holes making it difficult to change the knives.

To access these various components and areas, some manufacturers of the disk-style machines often hinge the upper half or quarter of the chipper body to service the knives. Such machines include the Model 1230 Chipper manufactured by Vermeer and the Model 90 Brush Bandit manufactured by Bandit. The bed knife, however, remains difficult to adjust. Some other manufacturers such as Carlenburg for Mittsonmurrel Drum Machines and Gravely Disk Chippers facilitate the servicing of knives by hinging the feed hopper or sliding the upper feed roller vertically in a slide with weights or spring down pressure. In many of these systems, replacing the feed rollers requires one to crawl inside the machine and awkwardly perform the replacement. Morey, U.S. Pat. No. 5,005,620 discloses an upper feed roller pivoted from the chipper drum centerline (called the pivoted down stream). Houston, U.S. Pat. No. 4,390,132 discloses a trailing arm that is pivoted from a point above the feed path. A hydraulic cylinder and a compression spring force the engagement with the tree (feed stock). To reduce the frequency of required access, most manufacturers of chippers with lower feed rollers simply place an auxiliary frame or compartment that traps the dirt and debris.

SUMMARY OF THE INVENTION

The present invention is directed, in a first aspect, to a brush chipper in which access to frequently maintained areas of the chipper is facilitated. According to the one embodiment of the invention, the chipper comprises a chipper-knife assembly, a feed-roller assembly, and a sliding apparatus that permits a part or the whole feed-roller assembly to move away from the chipper-knife assembly. This sliding apparatus preferably includes at least one track and at least one friction-reducing apparatus such as a sliding roller or a bearing.

Another aspect of the invention is directed to a mounting for the chipper-knife assembly. In a preferred embodiment, the chipper-knife assembly comprises a knife with at least one threaded opening attached to a support. To attach the knife, a bolt passes through the support to thread into the knife. The bolt can include a head and a stem, and the support is positioned between the knife and the head of the bolt.

BRIEF DESCRIPTION OF THE DRAWING

These and other aspects of the present invention will become better understood through a consideration of the following description taken in conjunction with the drawings in which.

DETAILED DESCRIPTION OF THE PREFERRED EMBODIMENT

Figure 1:
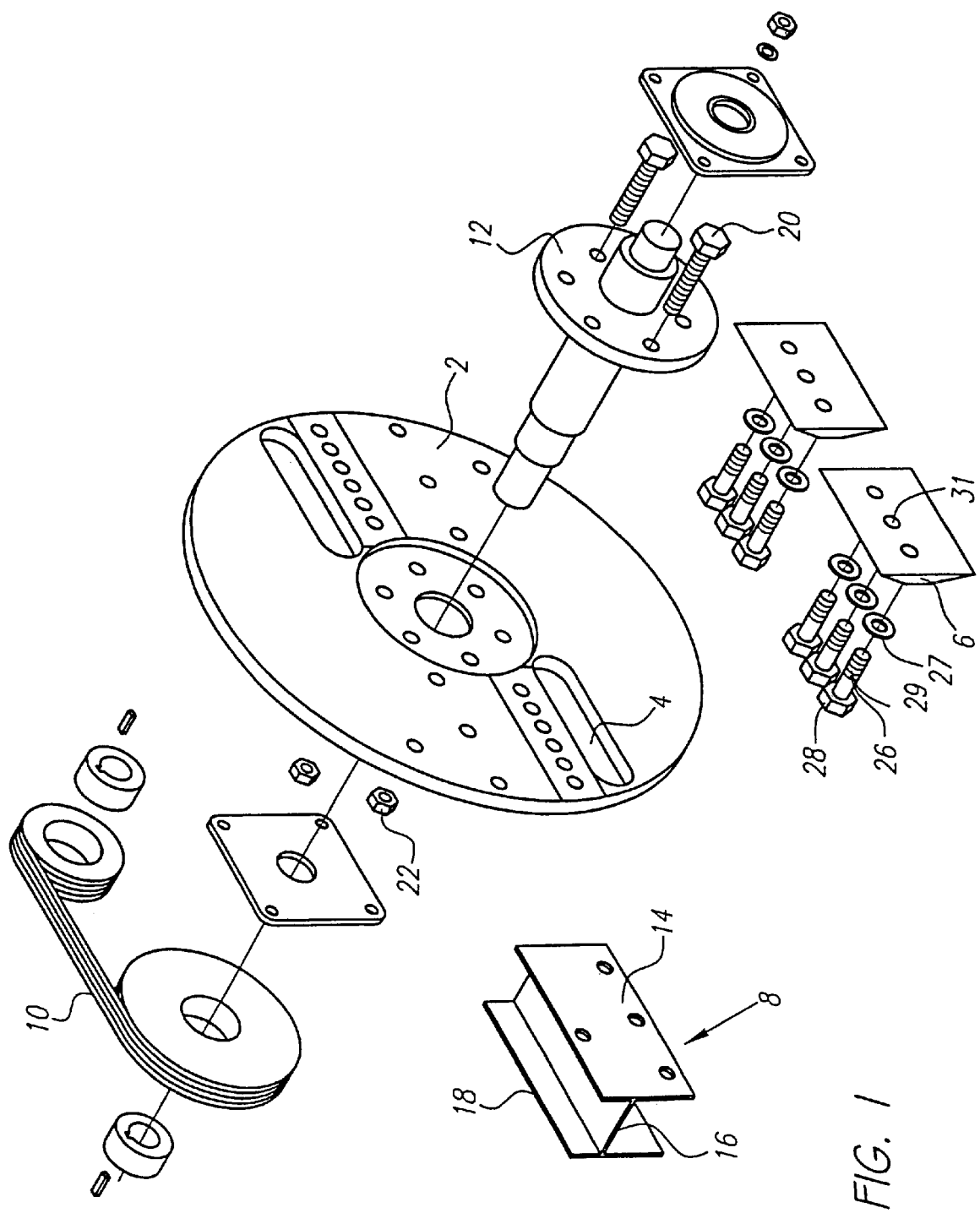
FIG. 1 is a diagram of an exploded perspective view of a chipper disc and attachments according to one embodiment of the present invention.

FIG. 1 shows a disc 2 with knife channels 4, and chipper knives 6, fan assemblies 8, and pulley belt drive 10 attached to the disc 2. The disc 2 is preferably about 42" in diameter, 2" thick, comprised of A-36 steel, and is made to rotate about an axle 12 at about 1100 rotations per minute (rpm) by a motor (not shown) attached to the pulley belt drive 10. Knife channels 4 communicate across the disc 2, thereby permitting chips and debris to pass through the disc 2 and out of a discharge tube 76 (See FIG. 5).

Each fan assembly 8 shown in FIG. 1 preferably includes a base 14, a fan blade 16 and a fence 18. Bases 14 are attached to the disc 2 with bolts 20 and lock nuts 22. Each fan blade 8 is preferably attached to the disc 2 through one of the bases 14 and are preferably oriented approximately twelve degrees off radial with respect to the axle 12 to encourage radial air flow. The fences 18 assist in holding air and light material to the fan blades 16 and further encourage radial airflow. A preferred embodiment has four fan assemblies 8, but fewer or greater number of fan assemblies 8 can also be accommodated on the disc 2.

Figure 2:
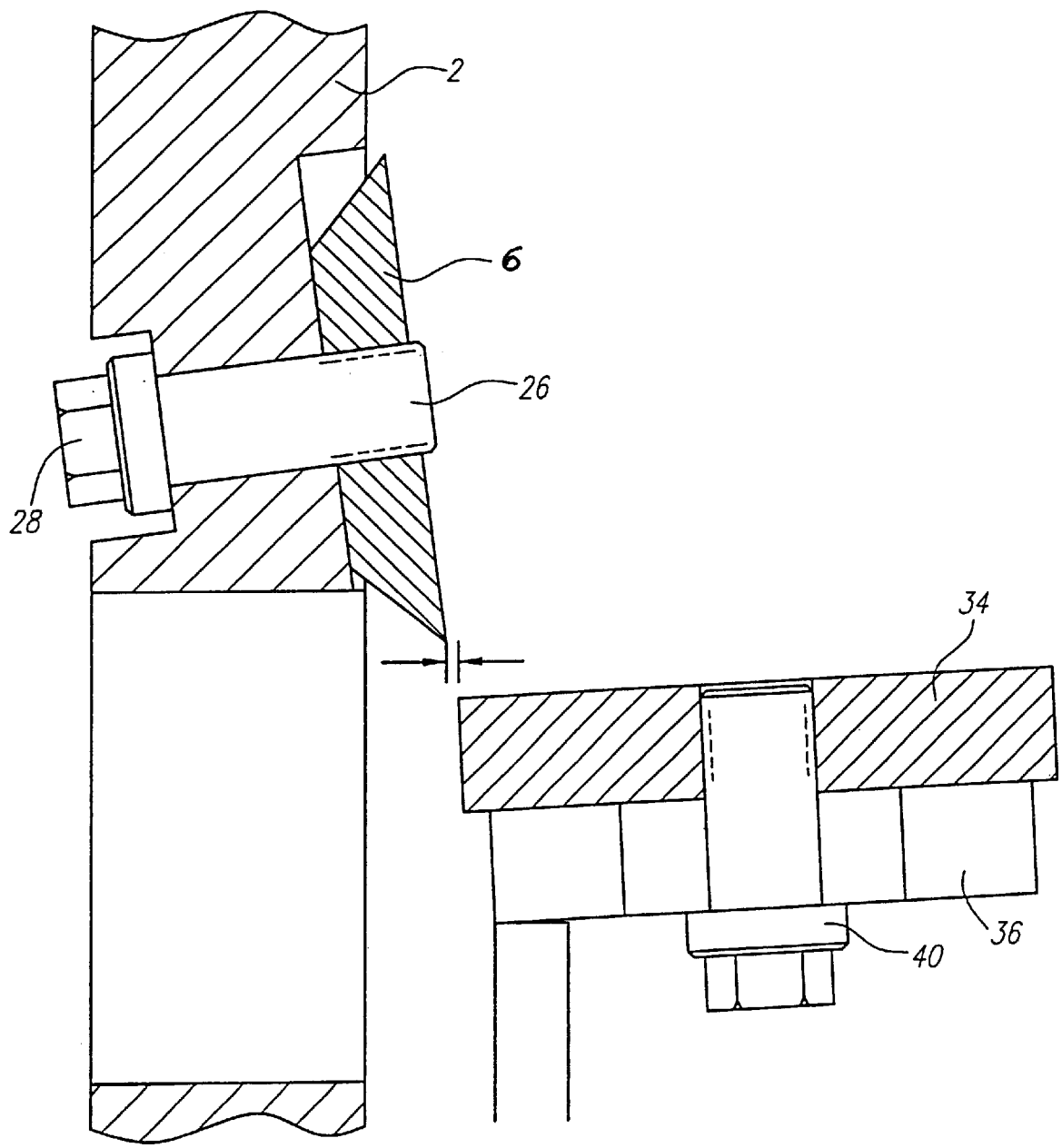
FIG. 2 is a diagram of a close-up side view of a chipper-knife section attached to the disc of FIG. 1.

In FIGS. 1 and 2, chipper knives 6 are positioned as an assembly of components on the disc 2. Each chipper knife 6 preferably has two cutting edges to make them reversible. Each chipper knife 6 is preferably manufactured to be expendable or disposable such that once both edges are dulled, it is easily replaced. Chipper knives 6 are preferably attached to the disc 2 by bolts 26 and lock washers 27. Each bolt 26 is made up of a head 28, preferably a ¾" hex head and a threaded stem 29. The bolts 26 hold the knives 6 by passing through the disc 2 from the backside of the disc 2 to thread into the knives 6. Each knife 6 includes at least one threaded opening 31 for inserting with a bolt 26. Preferably, the threaded openings 31 are located in a middle section of the knives 6. Thus, the chipper knives 6 are effectively positioned on a side of the disc 2, which supports the knives 6. Likewise, the bed knife 34 includes at least one threaded opening for inserting a bolt 40. The bolt is threaded through the bed knife 34 from the back side of a bed knife holder 36 or other support.

In this type of construction, the heads of the bolts 40, 26 are neither directly exposed nor impacted with the debris. This effectively prevents stripping out the hexagon-shape head of the bolts 40, 26 making the knives 6 easy to replace.

Figure 3:
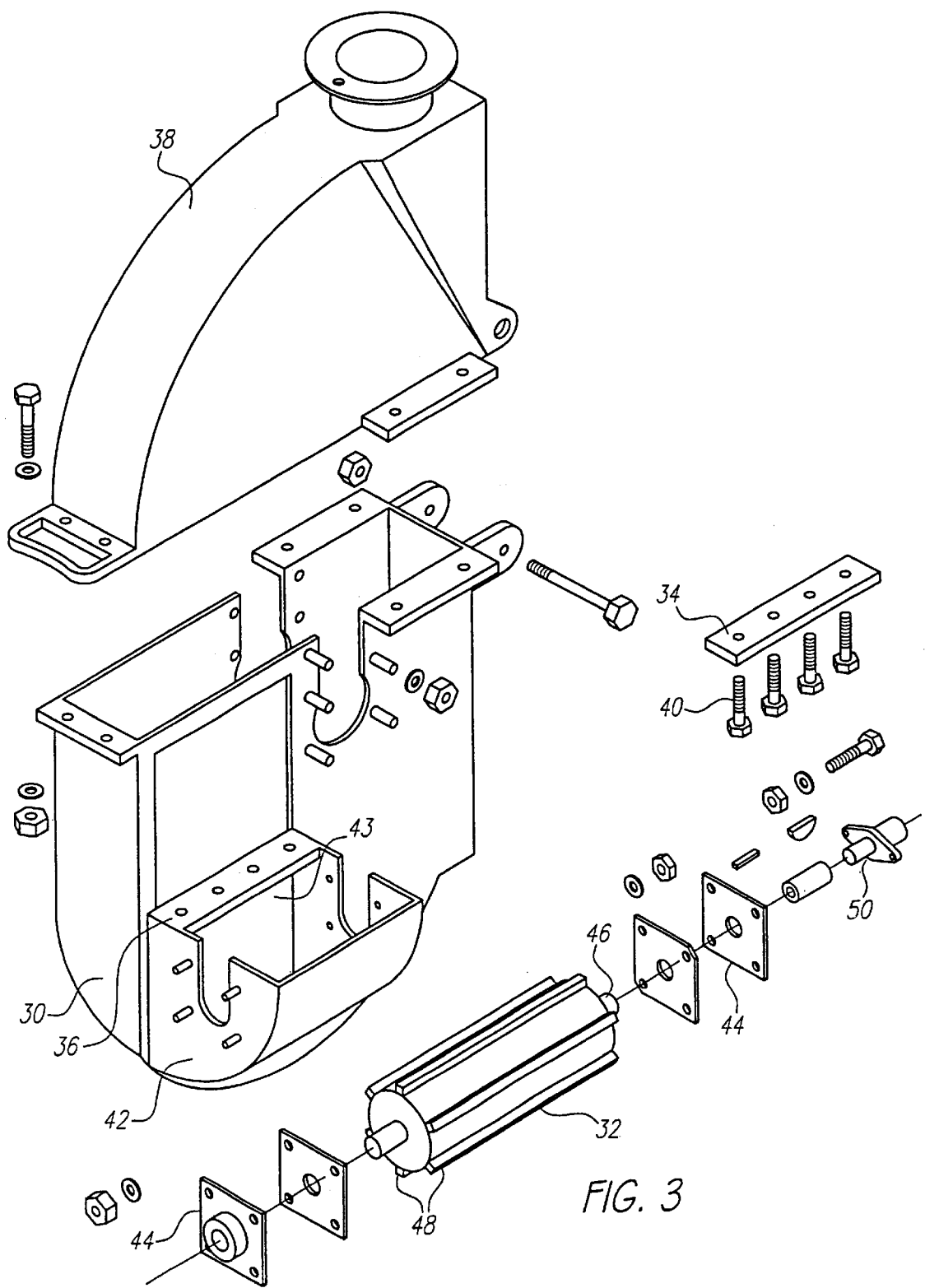
FIG. 3 is a diagram of an exploded view of a chipper-housing assembly for a disk chipper such as that depicted in FIG. 1.

FIG. 3 shows the chipper housing assembly that houses the disc 2 and the chipper-knives assembly. This chipper housing assembly includes the housing for the disc 2, an attached lower feed roller 32, and the bed knife 34. The housing is constructed in two sections, a cover weldment 38 and a body weldment 30. Integrated into the body weldment 30 is a bed knife holder 36. The bed knife 34 is then secured to the holder 36 with bolts 40 as shown in both FIGS. 2 and 3. The bed knife 34 is adjusted to preferably have a 0.090-inch gap between it 34 and the closest chipper knife 6 on the disc 2. Integral to the body weldment 30 is a lower feed roller chamber 42. During rotation of the disc 2, the fan blades 8 of the disc 2 vacuum trash and debris into the disc housing section of the body weldment 30 that enters the lower feed roller chamber 42. Because of the integrated design of the body weldment 30 and the lower feed roller chamber 42, the vacuuming of the lower feed roller chamber 42 preferably takes place through the opening 43 in the disc housing.

The lower feed roller 32 reduces the friction of the incoming wood and brush, which drop loose debris. The debris then passes through the opening 43 in the disc housing to be blown out of the discharge tube 76 (See FIG. 5) by the fan blades 8 on the revolving disc 2. The lower feed roller 32 is held in place by bearings 44 attached to the lower feed roller chamber 42. The lower feed roller 32 preferably has an 8-inch diameter and is 14inches wide. Preferably, a 1½ inch diameter shaft 46 extending beyond the lower feedroller's width and providing the bearings' point of support and rotation for the lower feed roller 32, is integrated with the roller 32 itself. The lower feed roller 32 is thereby supported within the chamber 42 for rotation about a generally horizontal axis. The lower feed roller 32 preferably includes rows of low profile cleats 48 running along its width. Moreover, the lower feed roller 32 is preferably mounted close to the bed knife 34 and the disc 2. Finally, lower feed roller 32 is preferably powered by a 16 cubic inch at 6,329 in.-lbs. torque hydraulic motor 50 allowing for reverse or forward rotation.

Figure 4:
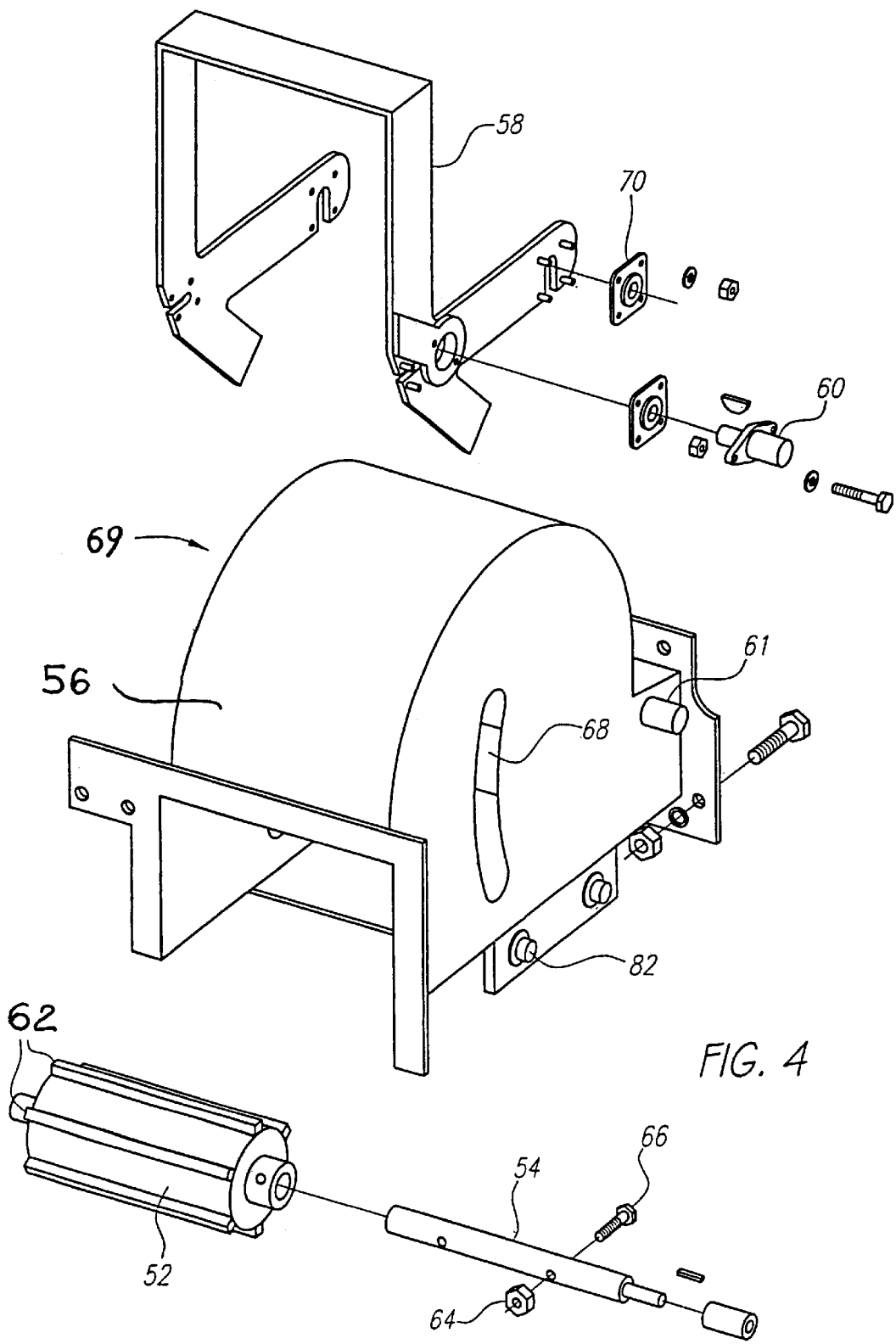
FIG. 4 is a diagram of an exploded perspective view of an upper feed-roller arm and housing weldment according to one embodiment of the present invention.

FIG. 4 depicts an embodiment of a assembly for the upper feed roller 52. The upper and lower feed rollers 52, 32 receive the input material from the in-feed hopper 72. (See FIG. 5.) The assembly includes an upper feed roller 52, an upper feed roller shaft 54, an upper feed roll weldment 56, a trailing arms assembly 58, and hydraulic motor 60. The upper feed roller 52 is positioned above the lower feed roller 32 and is rotatably supported by the trailing arm assembly 58. The pivot points 61 for the upper feed roller 52 on the arm assembly 58 are on the sides of the weldment 56. Bearings 70 provide support to the trailing arm assembly 58 allowing for pivoting of the assembly 58 and upper feed roller 52. The arms' length of the trailing arm assembly 58 and its pivot point are positioned so as to insure a ratchet-type action when the roller 52 is in operation. This ratchet-type action naturally increases the bite down pressure on in-feeding wood and debris. The upper feed roller 52 preferably has the same 14-inch width as the lower feed roller 32, and preferably has a diameter of 12 inches. Rather than cleats 48, the upper feed roller 52 has preferably ten sharpened blades 62, each having the same width as the roller 52 itself. The shaft 54 of the upper feed roller 52 preferably has a length that exceeds the width of the upper feed roller 52. The shaft 54 runs through the center of the upper feed roller 52, and is attached to the upper feed roller 52 with nuts 64 and bolts 66. The upper feed roll weldment 56 covers the upper feed roller 52 and provides a track 68 for movement of the upper feed roller 52 caused by the pivoting of the trailing arms assembly 58. The upper feed roller 52 is preferably independently powered by a 28 cubic inch at 11,269 in.-lbs. torque hydraulic motor 60 allowing for forward or reverse rotation. A feed-roller housing 69 houses the upper feed-roller assembly.

Figure 5:
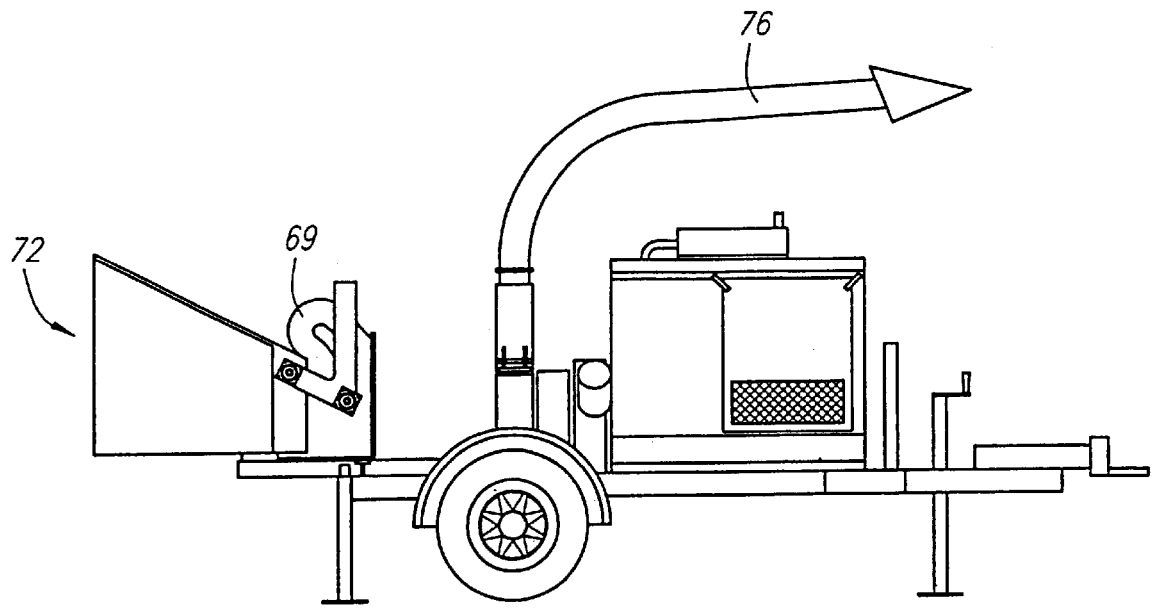
FIG. 5 is a diagram of a side view of a brush chipper according to one embodiment of the present invention where the chipper housing is separated from the feed-roller housing.
Figure 6:
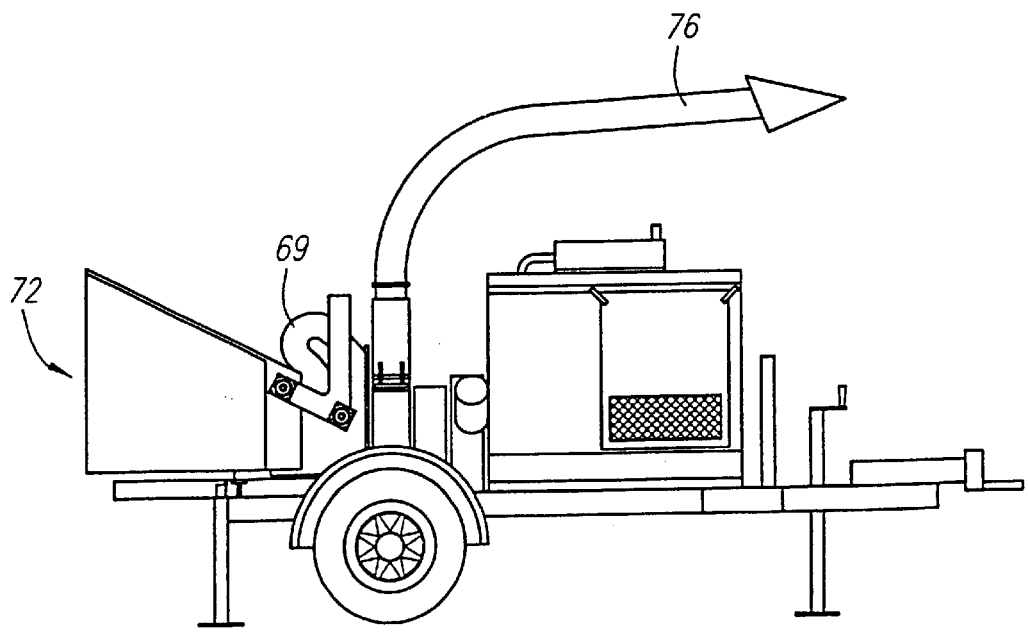
FIG. 6 is a diagram of a side view of a brush chipper according to one embodiment of the present invention where the chipper housing is adjacent to the feed-roller housing.

FIG. 5 shows a side-view drawing of the brush chipper with the feed-roller housing 69 containing the upper feed roller 52 assembly slid away and separated from the chipper housing assembly. Because of a sliding apparatus mounted underneath the feed roller housing, one person may easily separate the feed-roller housing 69 from the chipper housing assembly. Once separated, the chipper knives 6, the bed knife 34, the knife holders 24, the upper and lower feed rollers 52, 32 are easily accessed for adjustment or replacement. (See FIG. 8) To operate the brush chipper, the user then slides the feed roller housing back adjacent to the chipper housing assembly as in FIG. 6. Locks and safety switches, which are already known in the art, may also be employed to ensure that the feed-roller housing does not slide open during operation or that the brush chipper engine shuts off when the feed-roller housing is slid open.

Figure 7:
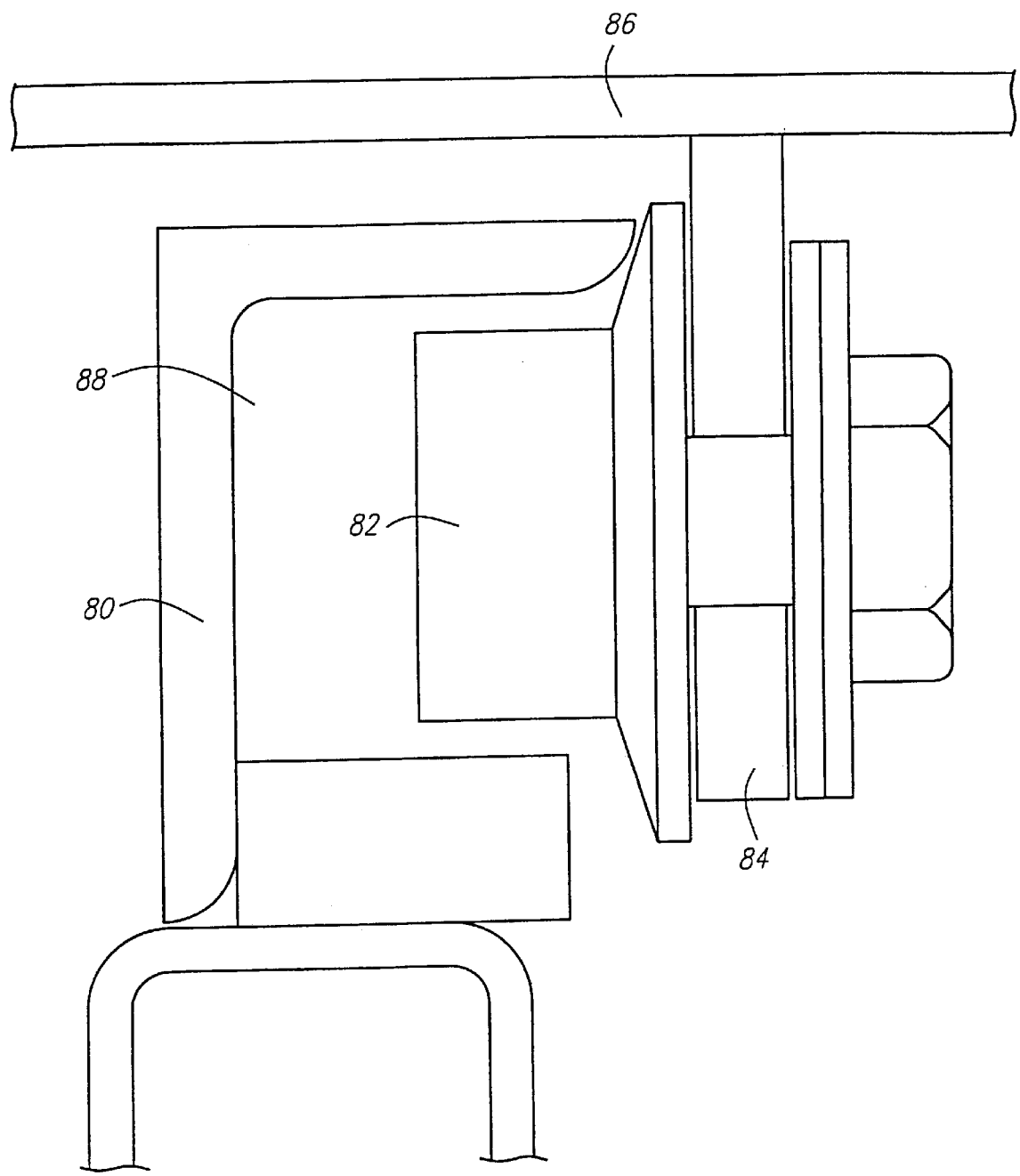
FIG. 7 is a diagram of a close-up section view of a sliding apparatus used for separating the feed-roller housing from the chipper housing assembly.
Figure 8:
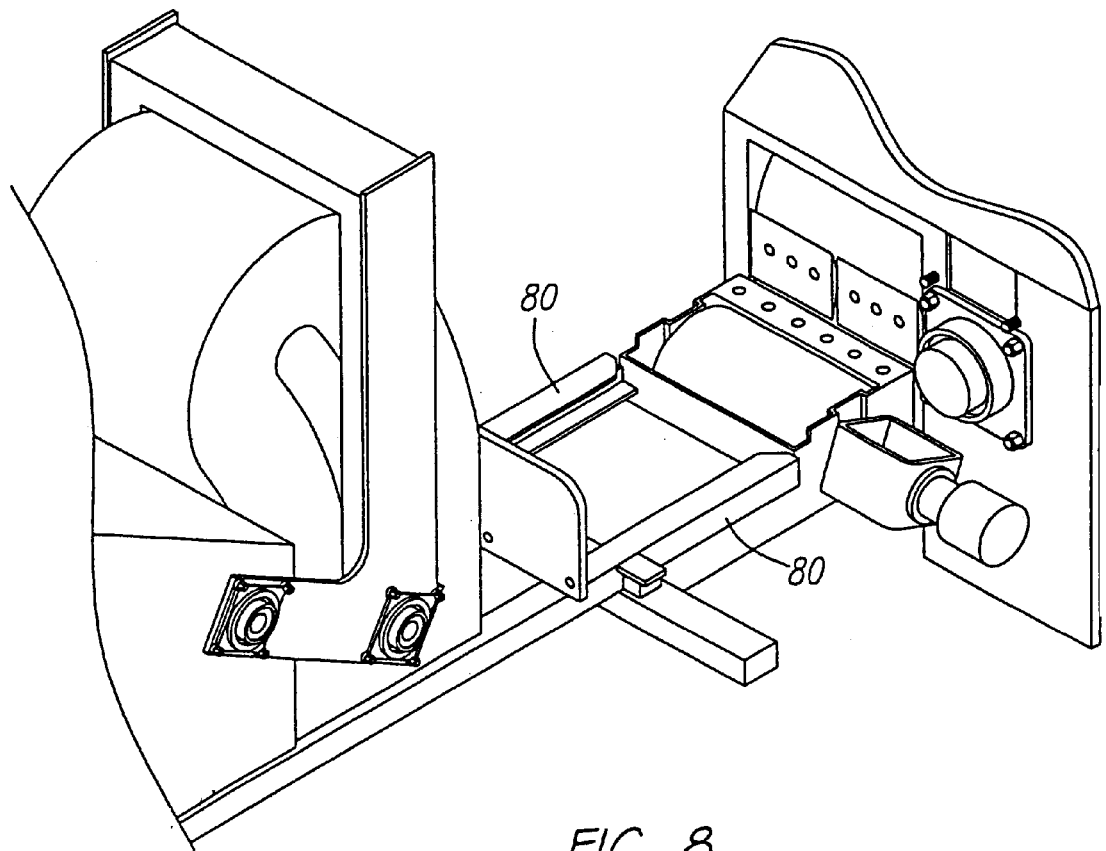
FIG. 8 is a diagram of a close-up perspective view of a brush where the chipper-knife assembly is inside the chipper housing assembly and is separated from the feed-roller housing.

The sliding apparatus preferably comprises a set of parallel tracks or guides and a friction-reducing apparatus underneath the feed-roller housing 69. FIGS. 7 and 8 depict one embodiment of a sliding apparatus using a track and roller system. The track and roller system includes two parallel tracks 80 running from the chipper housing assembly and underneath the feed-roller housing. Sliding rollers 82, preferably numbering four with two rollers on each side of a metal plate 86, are screwed onto the side bars 84 of the metal plate 86 and roll along the grooves 88 provided inside the tracks 80. The metal plate 86 attaches to the underside of the feed-roller housing such that the feed-roller housing rolls toward or away from the chipper housing. The sliding rollers 82, alternatively, are designed as bearings instead. It is understood that the track or guide and the friction-reducing apparatus can be interchangeably located underneath the feed-roller housing.

While specific embodiments of this invention have been disclosed and described, it would be apparent to those skilled in the art that the invention can be modified in arrangement and detail without departing from such principles. As such it should be recognized that the detailed embodiment is illustrative only and should not be taken as limiting the scope of the invention. Rather, the invention is not to be restricted except within the scope and spirit of the following claims and equivalents thereto.

What is claimed is:

1. A brush chipper for chipping an object, the chipper comprising:

a chipper-knife assembly inside a chipper housing;

a feed-roller assembly inside a feed-roller housing adjacent to the chipper housing; and a sliding apparatus for separating the feed-roller housing and the chipper housing.

2. The brush chipper of claim 1 wherein the sliding apparatus comprises:

at least one track and;

at least one friction-reducing apparatus that runs along the at least one track.

3. The brush chipper of claim 2 wherein the at least one friction-reducing apparatus comprises at least one sliding roller attached to an underside of the feed-roller housing.

4. The brush chipper of claim 2 wherein the at least one friction-reducing apparatus comprises at least one bearing.

5. The brush chipper of claim 1 wherein the feed-roller housing separate from the chipper housing within a fixed distance.

6. The brush chipper of claim 1 wherein the feed-roller housing separate from the chipper housing along a straight line.

7. The brush chipper of claim 1 wherein the chipper-knife assembly comprises:

a knife comprising an opening;

a bolt for attaching the knife to a support; and wherein the bolt threads through the opening of the knife.

8. The brush chipper of claim 7 wherein the opening of the knife is threaded.

9. The brush chipper of claim 7 wherein the bolt passes through a backside of the support to secure the knife.

10. The brush chipper of claim 7 wherein the bolt comprises a head integrally connected to a stem.

11. The brush chipper in claim 10 wherein the stem of the bolt passes through a backside of the support to reach the knife.

12. The brush chipper in claim 10 wherein the support is positioned between the head of the bolt and the knife.

13. The brush chipper in claim 7 wherein the bolt includes a hexagonally shaped head.

14. The brush chipper in claim 7 further wherein the chipper-knife assembly further comprises a washer secured between the support and a head of the bolt.

15. The brush chipper in claim 7 wherein the support is a rotating disc.

16. The brush chipper in claim 7 wherein the threaded opening is located in a middle section of the knife.

* * * * *